United States Patent [19]

Coddington

[11] Patent Number: 5,668,975
[45] Date of Patent: Sep. 16, 1997

[54] METHOD OF REQUESTING DATA BY INTERLACING CRITICAL AND NON-CRITICAL DATA WORDS OF MULTIPLE DATA REQUESTS AND APPARATUS THEREFOR

[75] Inventor: John D. Coddington, Austin, Tex.

[73] Assignee: Motorola, Inc., Schaumburg, Ill.

[21] Appl. No.: 722,694

[22] Filed: Sep. 30, 1996

Related U.S. Application Data

[63] Continuation of Ser. No. 43,114, Apr. 5, 1993, abandoned.
[51] Int. Cl.$^6$ .................................................. G06F 13/362
[52] U.S. Cl. .................................................. 711/169; 711/151
[58] Field of Search ........................... 395/478, 484, 395/485, 496, 494, 495

[56] References Cited

U.S. PATENT DOCUMENTS

| | | | |
|---|---|---|---|
| 4,536,839 | 8/1985 | Shah et al. | 395/425 |
| 4,967,344 | 10/1990 | Scavezze et al. | 364/200 |
| 5,317,720 | 5/1994 | Stamm et al. | 395/425 |
| 5,333,296 | 7/1994 | Bouchard et al. | 395/425 |
| 5,347,648 | 9/1994 | Stamm et al. | 395/425 |

*Primary Examiner*—David L. Robertson
*Attorney, Agent, or Firm*—Lee E. Chastain

[57] ABSTRACT

A method of requesting data in a data processing system has the steps of receiving a plurality of requests for data by a request arbitrator (12) from a plurality of requesters (REQUESTER A, REQUESTER B, REQUESTER C), requesting a first portion of each request at a first time and requesting a second portion of each request at a second time. Each of the requests for data corresponds to a first portion of data. At least one of the requests also corresponds to a second portion of data. The first portions and second portion are requested according to a first and to a second predetermined order, respectively. The disclosed method requests a critical mount of data first for each request before any non-critical data portions are requested.

7 Claims, 4 Drawing Sheets

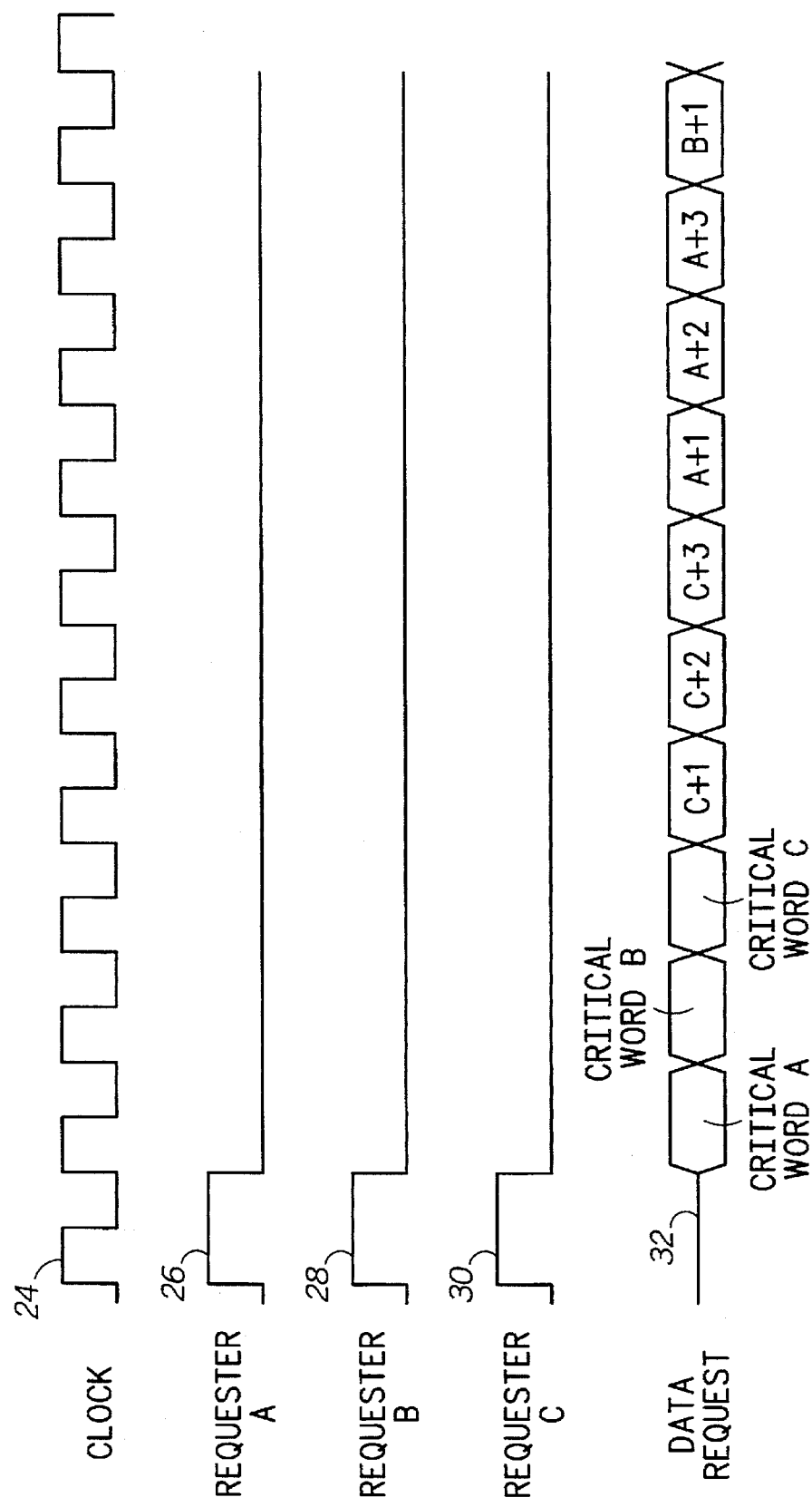

ns although the operations are addressed with a single index.
METHOD OF REQUESTING DATA BY INTERLACING CRITICAL AND NON-CRITICAL DATA WORDS OF MULTIPLE DATA REQUESTS AND APPARATUS THEREFOR This application is a continuation of prior application Ser. No. 08/043,114, filed Apr. 5, 1993 now abandoned.

FIELD OF THE INVENTION

The present invention generally relates to digital computing systems, and more specifically to protocols for data communications.

BACKGROUND OF THE INVENTION

One of the fundamental operations of a data processing system is a memory read operation. In a memory read operation, a data requester identifies a portion of data by an index, or an "address," and supplies the address to a memory system. The memory system then forwards an associated portion of data to the requester over one or more machine cycles. Initially, memory read operations were relatively simple operations. For instance, in the first generation of personal computers, the only data requesters were central processing units, the only memory systems were external banks of random access memory ("RAM") cells, and the only amount of data was a byte (8 bits). A RAM circuit could forward the single byte of data in a single machine cycle over a then typical eight-bit bus. Historically, the performance of each new data processing system eclipses the previous system's performance. Some of the most visible improvements between successive systems directly affect the complexity and scope of a memory read operation. Many of these improvements are especially significant to data processors that are integrated onto one or a few integrated circuits.

Some of the improvements to data processing systems that affect data read instructions are multiple execution units, hierarchical memory systems and multi-processor architectures. Architectures incorporating multiple execution units typically execute two or more instructions simultaneously. These concurrent instructions may be slightly staggered in time with respect to each other, as in pipelining schemes, they may be aligned in time, as in the case of superscalar data processors, or both. Regardless, multiple execution units create multiple data requesters that may simultaneously require data. Typically, multiple execution units request data from a small, high speed memory cache. A high speed memory cache is part of a two-level hierarchical memory system. A cache is complemented with a large, slower block of external RAM. Together, the cache and external block of RAM provide fast efficient memory accesses. Multi-processor architectures implement schemes in which multi-processors may require data from a single block of external memory or in which one of the processors may require data within the memory cache of another processor. In all these scenarios, data read operations must account for multiple requesters requiring data at, perhaps, the same time.

Two known improvements of the original read data operation are data burst and critical word first protocols. These protocols recognize that data read operations are time consuming and that memory accesses often occur to the same general area of memory during a small interval of time. This latter observation is called "locality."

According to a burst operation, several data read operations occur together as a group over several clock cycles although the operations are addressed with a single index. Initially, a requester may only require an amount of data equal to or less than the bandwidth of a data bus. However, the associated memory system forwards more data to the requester than allowed by the bus bandwidth in a single clock cycle. For instance, a sixty-four bit data processor may have a bus bandwidth of 128 bits. An associated memory system may forward a total of 512 bits to a requester over four clock cycles in a burst operation. In this case, the memory system forwards 128 bits during each clock cycle. Typically, the memory system forwards the four quad-words beginning at the address specified by X...XX000000 (most significant bit to least significant bit), where X means either 0 or 1 as specified by the requester's address. One of the underlying assumptions of a burst operation is that there is some likelihood that the requester will request some of the data adjacent the addressed byte at a subsequent time. If the requester does require some of the adjacent data at a later time, then the requester will already have the data and will not have to occupy the data bus.

A critical word first protocol is a refinement of the burst protocol described above. In the example above, a critical word first protocol requires that a memory system forwards a particular one of the four quad-words first. The other three quad-words follow the critical word. The first quad-word, or "critical word," is selected because it contains a particular data byte, half-word, word, etc. that is immediately needed by the relevant requester. A memory system can satisfy the critical word first protocol by forwarding the quad-word indexed by the address X...XXXX0000 (most significant bit to least significant bit), where X means either 0 or 1 as specified by the requester's address.

Known protocols have not kept pace with improvements in data processing architecture. For instance, the two protocols described above are designed primarily to increase the efficiency of read operations that occur serially. They do not provide a protocol for use with simultaneous data requests.

SUMMARY OF THE INVENTION

In accordance with the present invention, there is disclosed a method for requesting data which substantially eliminates disadvantages of prior data requesting protocols.

A method of requesting data in a data processing system has the steps of receiving a plurality of requests for data by a request arbitrator from a plurality of requesters, requesting a first portion of each request at a first time and requesting a second portion of each request at a second time. Each of the requests for data corresponds to a first portion of data. At least one of the requests also corresponds to a second portion of data. The first portions and the second portion are requested according to a first and to a second predetermined order, respectively.

In addition, a data processing system is disclosed having a plurality of memory cells, each storing a data value, coupled to a request arbitrator. The request arbitrator receives a plurality of requests for data. Each of the plurality of requests for data corresponds to a first portion of one of the plurality of data values and at least one of the plurality of requests for data also corresponds to a second portion of one of the plurality of data values. The request arbitrator requests each first portion of the plurality of requests for data in a first predetermined order at a first time and requests each second portion of data of the plurality of requests for data in a second predetermined order at a second subsequent time.

BRIEF DESCRIPTION OF THE DRAWINGS

The features and advantages of the present invention will be more clearly understood from the following derailed description taken in conjunction with the accompanying FIGURES where like numerals refer to like and corresponding parts and in which:

FIG. 6 depicts a timing diagram of the data processor depicted in FIG. 1 according to a second embodiment.

DETAILED DESCRIPTION OF A PREFERRED EMBODIMENT

Figure 1:
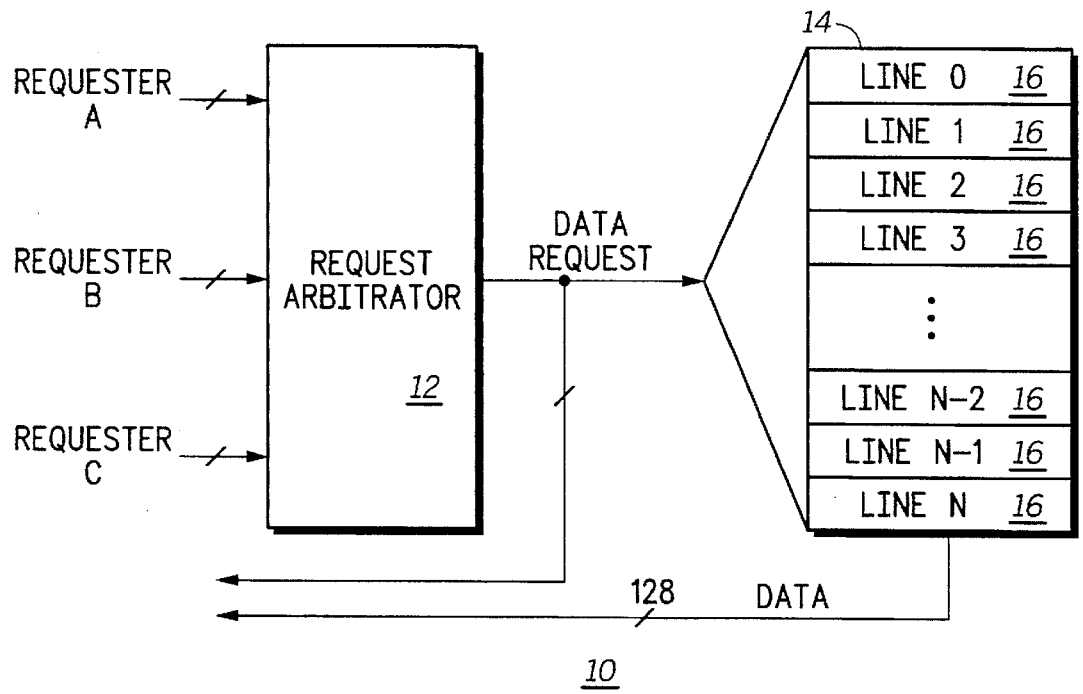
FIG. 1 depicts a block diagram of a data processor constructed in accordance with the present invention.

FIG. 1 depicts a block diagram of a data processor 10 constructed in accordance with the present invention. Data processor includes a request arbitrator 12 and a block of memory lines 14. The individual lines of memory block 14 are labeled "LINE 0, LINE 1, LINE 2," etc.. Request arbitrator 12 receives a plurality of requests for data, labeled REQUESTER A, REQUESTER B and REQUESTER C. Request arbitrator forwards portions of the various requests to memory cells 14 via a path labeled DATA REQUEST at various times as will be described below. Memory cells 14 then forward data corresponding to the forwarded request via a path labeled DATA. As will be described below, request arbitrator 12 receives a plurality of requests for data contained in memory block 14. Each request has associated with it a critical word and one or more non-critical words. First, request arbitrator 12 will forward each critical word request to memory block 14 according to a first priority order. Second, request arbitrator 12 will forward each non-critical word to memory block 14 according to the same priority order. Request arbitrator 12 and memory block 14 are thereby able to supply data to multiple data requesters in an efficient manner even if the requests are simultaneous.

It should be understood that data processor 10 is a highly simplified rendering of a data processor. Most portions of data processor 10 are omitted because their inclusion does not aid in the understanding of the disclosed invention. For instance, one skilled in the art will readily understand that data processor 10 includes such units as one or more execution units, a data bus interface unit, etc..

The disclosed invention may be implemented in one or more possible ways within a data processing system. Request arbitrator 12 and memory block 14 may both be within or outside of a data processor. Further, there is no requirement that the two units be together on a single integrated circuit. Other applications of the disclosed invention will be apparent to one skilled in the art in conjunction with the accompanying description.

In the depicted embodiment, request arbitrator 12 is a memory management unit within data processor 10 and memory block 14 is a memory cache within the same data processor. A memory management unit manages data flow into and out of an associated memory cache. In this case, Requester A, B and C may be a data fetch unit, an instruction fetch unit and a bus interface unit, respectively. The data returned to these three units would be used by the data processor as data, by the data processor as instructions or by an external device connected via a bus (not depicted) as either data or instructions, respectively.

In a second embodiment, request arbitrator 12 may be a memory management unit on a data processor and memory block 14 may be an external block of memory. In this case, request arbitrator 12 may be an L2 cache controller. Two of the three requesters may be an L1 cache controller and a bus interface unit. These two requesters would return data to a L1 cache controller after a miss in the L1 cache and to an external device connected via a bus, respectively.

In a third embodiment, request arbitrator 12 may be a stand alone device that monitors a bus in an environment in which there are several devices that may request data from memory block 14. In this case memory block 14 may be integrated within or outside of the integrated circuit containing request arbitrator 12. A multi-processor data pressing system is another environment in which multiple requesters may require data from a single block of memory. In a multi-processor data processing system, Requester A, B and C correspond to a different one of three data processors.

Figure 2:
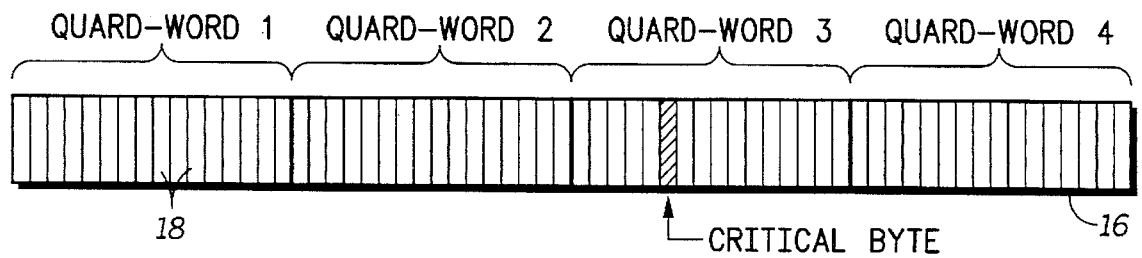
FIG. 2 depicts a block diagram of a memory line depicted in FIG. 1.

FIG. 2 depicts a block diagram of an exemplary memory line 16 depicted in FIG. 1. In the illustrated embodiment, memory line 16 has sixty-four individual bytes 18. Each byte 18 contains eight bits of data. Therefore, the total line contains five hundred and twelve bits of data. The sixty-four bytes of data may be grouped into four quad-words (128 bits), labeled QUAD-WORD 1, QUAD-WORD 2, QUAD-WORD 3 and QUAD-WORD 4. As depicted in FIG. 1, the path DATA is one hundred and twenty-eight bits wide. Therefore, up to one entire quad-word may be forwarded to a requester during each clock cycle. In a burst read operation, request arbitrator 12 requests an amount of data that requires more than one clock cycle to forward. Here, request arbitrator 12 requests, and memory block 14 forwards a memory line over four clock cycles. In particular, one of the four quad-words of a particular line, one-fourth of the memory line, is forwarded to the requester during one of four clock cycles. Each of the remaining three quad-words is forwarded to the requester during three other clock cycles. As will be described below, other data requests may intervene between these four clock cycles.

When request arbitrator 12 requests a particular line of memory block 14, it does not always begin with the same quad-word within the line. Instead, request arbitrator 14 first requests the quad-word containing a critical data word. Request arbitrator 12 requests the remaining three quad-words at a later time. The size of a critical data word is smaller than the total burst size and as large as the bandwidth of path DATA. By definition, the critical word is the data that the relevant requester needs immediately. The remaining data within the line may only be needed by the requester for locality reasons described above. In the illustrated embodiment, a critical data word is a byte. Although a particular line size, data path size and critical word size are described, the disclosed invention is not limited to these particular sizes.

As an example, FIG. 2 depicts memory line 16 requested by a particular requester. In the illustrated example, the particular requester requires the entire data line but especially needs the sixth byte, labeled CRITICAL BYTE, in QUAD-WORD 3. Therefore, request arbitrator 12 will request the third quad-word of the depicted memory line first. The protocol concerning the remaining three quad-words is described below.

Figure 3:
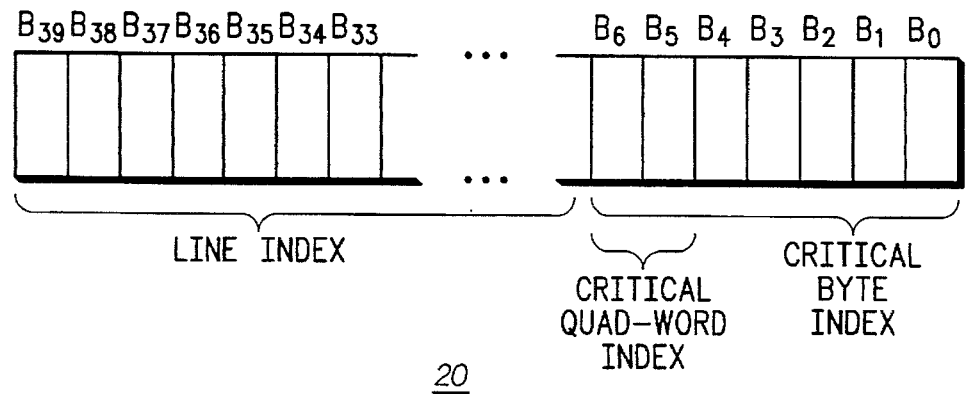
FIG. 3 depicts a block diagram of an address format used to index the memory line depicted in FIG. 2.

FIG. 3 depicts a block diagram of an address format 20 used to index the memory line 16 depicted in FIG. 2. In the depicted embodiment, each byte of memory block 16 has a unique forty bit address. The thirty-four most significant bits of a particular address (labeled $B_{39}$ through $B_6$) index a particular memory line 16 in memory block 14. The remaining bits, the six least significant bits (labeled $B_5$ through $B_0$), index one of the sixty-four bytes within a particular memory line 16. The fifth and sixth bits (labeled $B_5$ and $B_4$, respectively) determine in which quad-word the requested byte will be. Continuing with the example begun in FIG. 2, the particular requester will forward a forty bit address to request arbitrator 12. The six least significant bits of the forwarded address will equal 100110, most significant bit to least significant bit. Request arbitrator 12 will first request the quad-word beginning with the byte indexed by the concatenation of the thirty-six most significant bits of the forwarded address and 0000. This concatenation indexes the first byte within the third quad-word. The remaining three quad-words are indexed by the concatenation of the thirty-four most significant bits, one of the three permutations of $B_5$ and $B_4$ different from the third quad-word values of those bits and 0000. In the illustrated example, the three permutations of $B_5$ and $B_4$ different from the third quad-word values of those bits are 00, 01 and 11.

Figure 4:
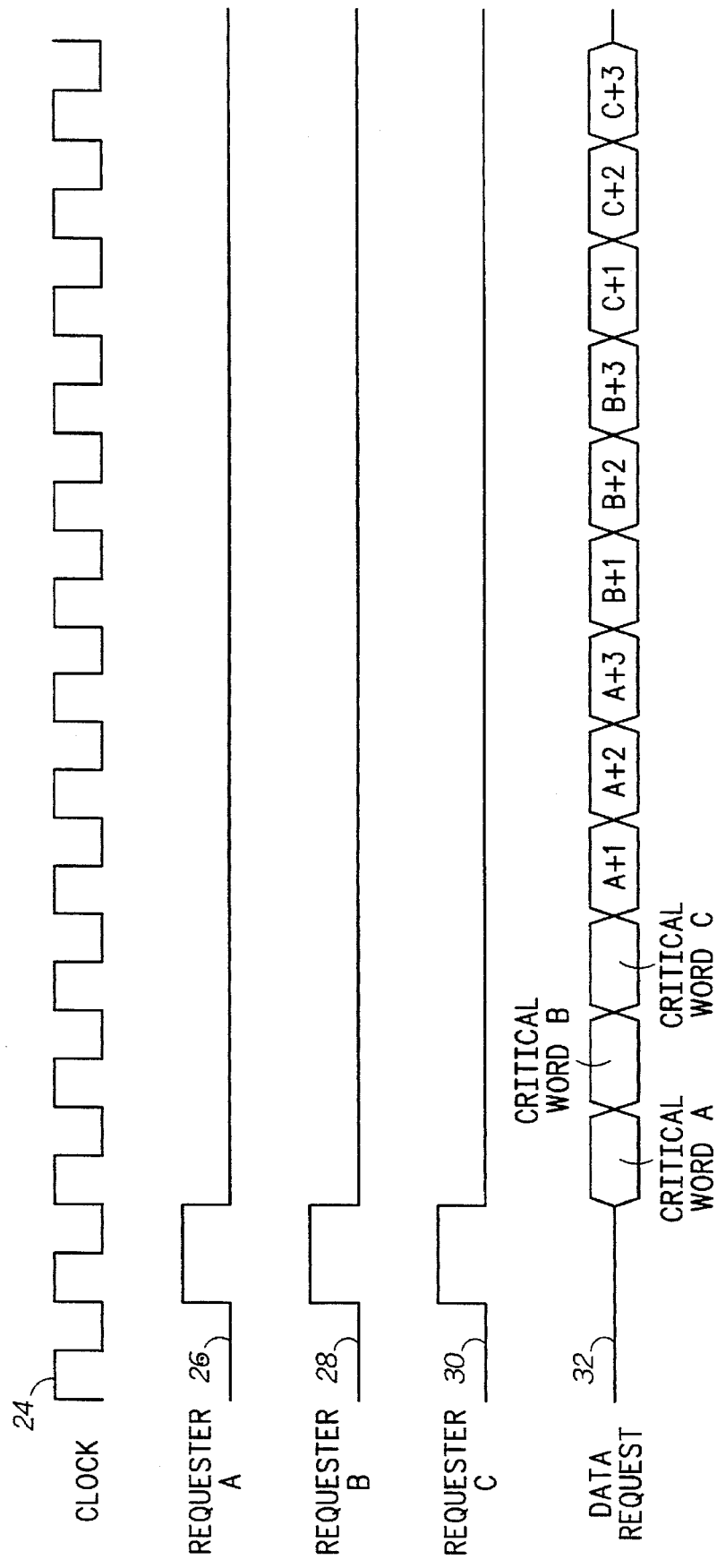
FIG. 4 depicts a timing diagram of the data processor depicted in FIG. 1 according to a first set of initial conditions.

FIG. 4 depicts a timing diagram 22 of data processor 10 depicted in FIG. 1 according to a first set of initial conditions. Timing diagram 22 depicts a clock signal 24, labeled CLOCK, a first request signal 26, labeled REQUESTER A, a second request signal 28, labeled REQUESTER B, a third request signal 30, labeled REQUESTER C, and a forwarded data request signal 32, labeled DATA REQUEST. These later four signals correspond to the four signals similarly named and depicted in FIG. 1. Each cycle of clock signal 24 corresponds to an interval of time in which memory block 14 may forward a group of data of maximum size equal to the bandwidth of the signal path DATA. During the second cycle of clock signal 24, each of the three requesters asserts its output indicating that each requests data from memory block 14. In this illustration, REQUESTER A requests data word A, REQUESTER B requests data word B and REQUESTER C requests data word C. Each data request is a four cycle data burst. However, only one of the requests need be a multiple cycle data operation to practice the disclosed invention. It should also be understood that the data request signal 32 may contain gaps where no data requests occur or in which other events occur not related to the disclosed invention. These details are dependent on details of request arbitrator 12 and memory block 14.

Continuing with FIG. 4, request arbitrator 12 first forwards an amount of data containing each critical word of the four requests according to a first priority scheme. Here, the first priority scheme is A-B-C. Therefore, request arbitrator 14 requests, in order, critical word A, critical word B and critical word C. As described above, the amount of data transferred during each clock cycle may be as large as the bandwidth of the data path, DATA. The critical word may be as large as, or smaller than, the bandwidth of the same data path. In the depicted embodiment, the data transfer mount and critical word size are one hundred and twenty-eight and eight bits, respectively.

Request arbitrator 12 requests the remaining data associated with each request only after it has requested each critical word. In this first embodiment, request arbitrator 12 follows the same first priority scheme. Therefore, request arbitrator 14 requests, in order, non-critical word A, non-critical word B and non-critical word C. As described above, each request requires four clock cycles to completely transfer all data. Hence, each non-critical data transfer requires three (four less the transfer containing the critical word) clock cycles to complete. The non-critical data request for data word A are labeled A+1, A+2 and A+3. The non-critical data request for data word B are labeled B+1, B+2 and B+3. The non-critical data request for data word C are labeled C+1, C+2 and C+3.

Figure 5:
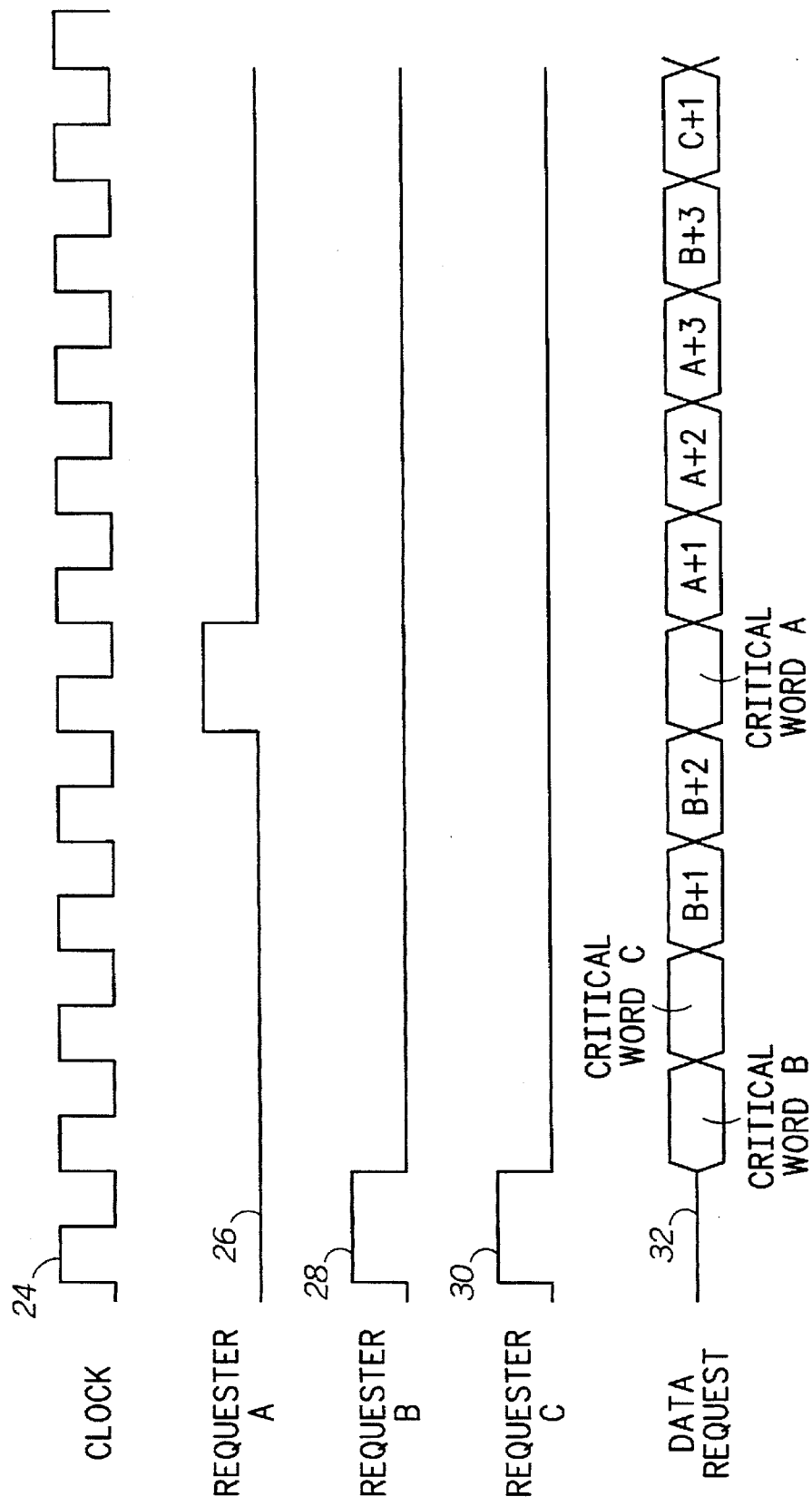
FIG. 5 depicts a timing diagram of the data processor depicted in FIG. 1 according to a second set of initial conditions.

FIG. 5 depicts a timing diagram of the data processor depicted in FIG. 1 according to a second set of initial conditions. Here, requester A requests data during the fifth cycle of clock signal 24. As depicted, request arbitrator 12 has already requested data containing critical word B, critical word C and a portion of the non-critical data of request B pursuant to two requests during the first cycle of clock signal 24. In this case, request arbitrator 12, stops requesting non-critical data (data that does not contain the critical word) and requests the critical word of requester A. After requesting this critical word, request arbitrator 12 requests non-critical data according to the same first protocol. In this case, request arbitrator 12 requests the three non-critical data words associated with requester A since requester A is a higher priority request than either request B or C. Request arbitrator then continues with the remaining portion of request B and C.

FIG. 6 depicts a timing diagram 36 of the data processor depicted in FIG. 1 according to a second embodiment. In this second embodiment, request arbitrator 12 requests non-critical data words according to a second priority scheme different from the first priority scheme. The depicted second priority scheme is C-A-B. As described in connection with FIG. 4, request arbitrator first requests data containing critical word A, critical word B and critical C. Request arbitrator 12 then requests non-critical word C, non-critical word A and non-critical word B. Again, each noncritical word requires three cycles to access. This second embodiment may be useful in applications where one of the requesters, C, is a bus common to several data processors.

The disclosed invention provides a communications protocol that integrates the advantages of data burst transfers within the constraints of multiple data requesters and data bus bandwidth limitations. The protocol allows critical data words to be requested on behalf of several data requests before non-critical data words associated with the data requests are requested from a memory system.

Although the present invention has been described with reference to a specific embodiment, further modifications and improvements will occur to those skilled in the art. For instance, request arbitrator 12 and memory block 14 may be implemented in a variety of embodiments, including multi- and, single-processor data processing systems and in data processing systems with primary or secondary memory caches. It is to be understood therefore, that the invention encompasses all such modifications that do not depart from the spirit and scope of the invention as defined in the appended claims.

What is claimed is:

1. A method of requesting data in a data processing system comprising the steps of:

receiving a first request for first data from a first requester and a second request for second data from a second requester by a request arbitrator, the first request comprising a first critical datum and a first plurality of non-critical data, the second request comprising a second critical datum and a second plurality of non-critical data;

at a first time, the request arbitrator requesting the first critical datum;

at a second time subsequent to the first time, the request arbitrator requesting the second critical datum;

at a third time subsequent to the second time, the request arbitrator requesting the first plurality of non-critical data; and at a fourth time subsequent to the second time, the request arbitrator requesting the second plurality of non-critical data.

2. The method of claim 1 wherein the first request and the second request comprise a first plurality of consecutive memory locations and a second plurality of consecutive memory addresses, respectively.

3. A method of requesting data in a data processing system comprising the steps of:

during a first time, receiving a first request for first data from a first requester, the first request comprising a first critical datum and a first plurality of non-critical data; requesting the first critical datum; requesting a first portion of the first plurality of non-critical data, the first plurality of non-critical data comprising a first portion and a second portion;

at a second time subsequent to the first time, the request arbitrator receiving a second request for second data from a second requester, the second request comprising a second critical datum; requesting the second critical datum; and at a third time subsequent to the second time, the request arbitrator requesting a second portion of the first plurality of non-critical data.

4. The method of claim 3 wherein the second request further comprises a second plurality of non-critical data and wherein:

at a fourth time subsequent to the second time, the request arbitrator requesting the second plurality of non-critical data.

5. The method of claim 4 wherein the first request and the second request comprise a first plurality of consecutive memory locations and a second plurality of consecutive memory addresses, respectively.

6. The method of claim 3 wherein the first request comprises a first plurality of consecutive memory locations.

7. A data processing system comprising:

a plurality of memory cells, each memory cell storing a data value; and a request arbitrator coupled to each of the plurality of memory cells, the request arbitrator receiving a first request for first data from a first requester and a second request for second data from a second requester, receiving a first request for first data from a first requester and a second request for second data from a second requester by a request arbitrator, the first request comprising a first critical datum and a first plurality of non-critical data, the second request comprising a second critical datum and a second plurality of non-critical data, the request arbitrator, in sequence, (1) requesting the first critical datum, (2) requesting the second critical datum, (3) requesting the first plurality of non-critical data, and (4) requesting the second plurality of non-critical data.

* * * * *

UNITED STATES PATENT AND TRADEMARK OFFICE
CERTIFICATE OF CORRECTION

PATENT NO. : 5,668,975

DATED : September 16, 1997

INVENTOR(S) : John Coddington

It is certified that error appears in the above-identified patent and that said Letters Patent is hereby corrected as shown below:

In the Drawings; figure2, the word "QUARD" should read --QUAD-- in four instances.

Column 8, lines 19-22, the phrase "receiving a first request for first data from a first requester and a second request for second data from a second requester by a request arbitrator" is printed in duplicate should be deleted.

Signed and Sealed this

Third Day of March, 1998

Attest:

BRUCE LEHMAN

Attesting Officer

Commissioner of Patents and Trademarks